United States Patent
Ma

(10) Patent No.: US 7,775,091 B2
(45) Date of Patent: Aug. 17, 2010

(54) METHOD AND APPARATUS FOR DETERMINING INTAKE AIR MASS

(75) Inventor: Qi Ma, Farmington Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 246 days.

(21) Appl. No.: 12/060,485

(22) Filed: Apr. 1, 2008

(65) Prior Publication Data

US 2008/0257026 A1    Oct. 23, 2008

Related U.S. Application Data

(60) Provisional application No. 60/912,220, filed on Apr. 17, 2007.

(51) Int. Cl.
*G01M 15/04* (2006.01)
(52) U.S. Cl. .................................... 73/114.32
(58) Field of Classification Search ............. 73/114.32, 73/204.11
See application file for complete search history.

(56) References Cited

U.S. PATENT DOCUMENTS

| 4,807,151 A | 2/1989 | Citron |
| 4,934,188 A | 6/1990 | Tanimoto et al. |
| 4,986,243 A * | 1/1991 | Weissler et al. ........ 123/406.65 |
| 5,000,039 A * | 3/1991 | Wright et al. ............. 73/114.32 |
| 5,152,174 A | 10/1992 | LaBudde |
| 5,193,388 A | 3/1993 | Kleinhans |
| 6,557,531 B2 * | 5/2003 | Ishikawa ..................... 123/488 |
| 6,955,080 B1 * | 10/2005 | Verdejo .................... 73/114.32 |
| 7,010,908 B2 * | 3/2006 | Koyama et al. ............... 60/277 |
| 7,177,770 B1 | 2/2007 | Hocken et al. |
| 7,205,781 B2 * | 4/2007 | Maslovich .................. 324/706 |
| 7,457,701 B2 * | 11/2008 | Tanaka ....................... 701/103 |
| 7,637,150 B2 * | 12/2009 | Bierl et al. ................ 73/114.32 |
| 2002/0014222 A1 | 2/2002 | Ishikawa |

FOREIGN PATENT DOCUMENTS

JP          03-269218 A      11/1991

* cited by examiner

*Primary Examiner*—Lisa M Caputo
*Assistant Examiner*—Freddie Kirkland, III

(57) ABSTRACT

A method for determining intake air mass into the engine includes equipping an air intake system with an air meter system configured to generate a signal output having a cycle period correlatable to an intake air mass. The signal output from the air meter system is monitored during an event, and successive cycle periods of the signal output from the air meter system are determined. Intake air mass for each of the successive cycle periods is determined and integrated.

15 Claims, 4 Drawing Sheets

METHOD AND APPARATUS FOR DETERMINING INTAKE AIR MASS

CROSS REFERENCE TO RELATED APPLICATIONS

This application claims the benefit of U.S. Provisional Application No. 60/912,220 filed on Apr. 17, 2007 which is hereby incorporated herein by reference.

TECHNICAL FIELD

This disclosure relates to monitoring intake air mass in an internal combustion engine.

BACKGROUND

The statements in this section merely provide background information related to the present disclosure and may not constitute prior art.

Known internal combustion engines operate at predetermined air/fuel ratios. The air/fuel ratio can be controlled by determining mass air flow into the engine and controlling engine fueling based thereon. The mass air flow can be measured using an air flow metering device or estimated based upon engine operating conditions using speed/density equations.

A known air flow metering device operates on the principle of anemometry, employing a sensing unit that can be a hot-wire device or a hot-film device. The sensing unit comprises a heated element placed within the air flow stream which can be maintained at a constant temperature differential above the ambient air temperature by the addition of electrical power. The amount of electrical power required to maintain the heated element at the proper temperature differential is directly related to the mass air flow rate past the sensing unit. It is known to communicate the amount of electric power to maintain the heated element of the sensing unit at the proper temperature to a control module as a digital signal consisting of a pulsewidth-modulated signal.

It is known that mass air flow into an engine can pulsate due to dynamic conditions in an engine intake system caused by engine throttling, opening and closing of intake valves and related air flow into engine cylinders, and other factors. It is known that such pulsation is most discernible in three, four, and five cylinder engines. The pulsation in the mass air flow can include reverse flow, i.e., air flow away from the engine. Pulsation and other conditions can introduce errors in measurement of mass air flow into the engine.

SUMMARY

An internal combustion engine operates using intake air and fuel. A method for determining an intake air mass into the internal combustion engine includes equipping an air intake system with an air meter system configured to generate a signal output having a cycle period correlatable to an intake air mass. The signal output from the air meter system is monitored during an engine event, and successive cycle periods of the signal output from the air meter system are determined. Intake air mass for each of the successive cycle periods is determined and integrated.

BRIEF DESCRIPTION OF THE DRAWINGS

One or more embodiments will now be described, by way of example, with reference to the accompanying drawings, in which.

DETAILED DESCRIPTION

Figure 1:
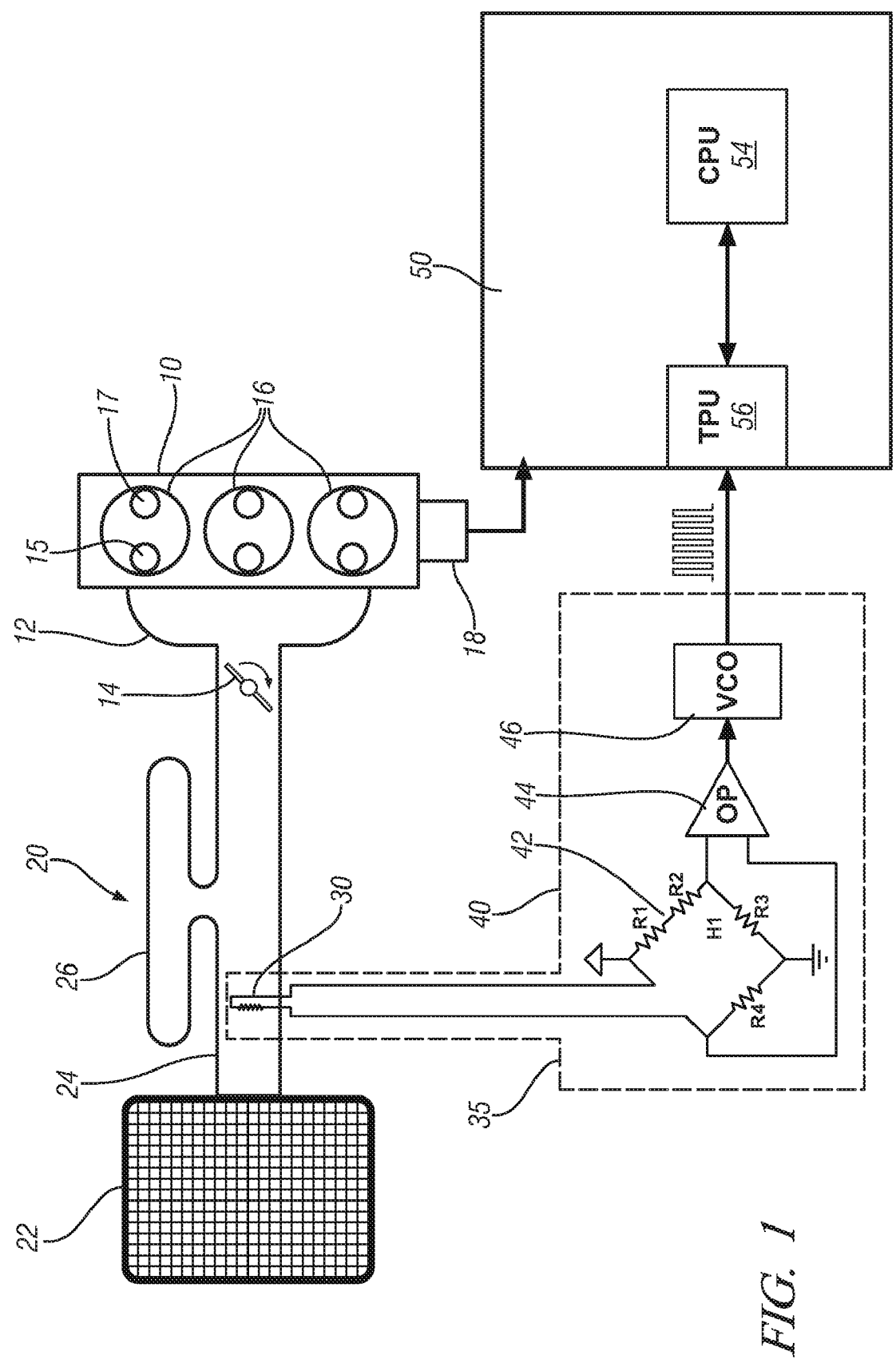
FIG. 1 is a schematic drawing, in accordance with the present disclosure.

Referring now to the drawings, wherein the showings are for the purpose of illustrating certain exemplary embodiments only and not for the purpose of limiting the same, FIG. 1 depicts a schematic diagram of an air intake system 20 for an internal combustion engine 10 that has been constructed in accordance with an embodiment of the disclosure.

The engine 10 comprises a multi-cylinder internal combustion engine including an intake manifold 12 that is fluidly connected to the air intake system 20. The engine 10 includes a cylinder head and an engine block having a plurality of cylinders containing reciprocating pistons which are slidably movable therein. The cylinder head, cylinder, and pistons form variable volume combustion chambers 16. Each piston is connected to a rotating crankshaft by which linear reciprocating piston travel is translated to rotational motion. Rotational position of the crankshaft is monitored by a crank sensor 18. Flow of intake air and residual exhaust gases into each combustion chamber 16 are controlled by one or more intake valve(s) 15. Exhaust flow out of each combustion chamber 16 is controlled by one or more exhaust valve(s) 17 to an exhaust manifold (not shown). Openings and closings of the intake and exhaust valves 15 and 17 can be controlled using actuation devices (not shown) which include a single camshaft, dual camshafts, or other devices actuated using one of electro-hydraulic, hydraulic, and electric control forces. The actuation devices for opening and closing the intake and exhaust valves 15 and 17 can include variable cam phasing devices, variable valve timing devices, and variable valve opening devices that are controlled by a control module 50 and which may operate in conjunction with or separate from the camshaft(s). The openings and closings of the intake and exhaust valves 15 and 17 are indexed with rotation of the crankshaft, such that opening of the intake valve 15 occurs during an intake stroke of an engine cycle for the combustion chamber 16 when the piston is moving from a top-dead-center position (hereafter 'TDC') to a bottom-dead-center position (hereafter 'BDC'). Furthermore, closing of the exhaust valve 17 occurs during an exhaust stroke of the engine cycle for the combustion chamber 16 when the cylinder is moving from the BDC position to the TDC position.

The air intake system 20 preferably includes an air filter device 22 fluidly connected to ductwork 24 leading to a throttle valve 14 which is operative to control air flow into the intake manifold 12. The throttle valve 14 preferably comprises an electronically controlled device responsive to a control signal from the control module 50. An oscillator device 26, in the form of a quarter-wave tube, can be installed as an element of the air intake system 20 for sound management.

An air meter system 35 comprising an air meter 30 and a signal conditioning circuit 40 monitors flow of intake air in the air intake system 20. The air meter 30 preferably comprises a hot-wire anemometer device operative to generate a change in electrical resistance that can be correlated to an intake air mass flowing past the air meter 30. The electrical leads from the air meter 30 are electrically connected to the signal conditioning circuit 40. The signal conditioning circuit 40 includes a resistance bridge circuit 42 commonly referred to as a Wheatstone bridge. The air meter 30 forms one leg of the resistance bridge circuit 42. The resistance bridge circuit 42 includes the air meter 30 and temperature-sensitive resistors including at least one resistor placed to sense ambient temperature ('R1' and 'R2'). The temperature-sensitive resistors are each formed such that their electric resistance changes with changes in ambient temperature. The change in electrical resistance encompasses the potential temperature range of the intake air passing the air meter 30. The resistance bridge circuit 42 includes other resistors ('R3' and 'R4') to create voltage-dividers for signal processing. Alternatively, other air meter sensors, e.g., hot film anemometers, can be used to monitor the mass air flow and generate a signal output correlatable to the flow of intake air in the air intake system 20.

The air meter 30 is placed in the air flow stream in the air intake system 20. As the intake air flows across the air meter 30, heat is dissipated in proportion to the magnitude of the mass air flow. Thus, the voltage output across the resistance bridge circuit 42 is a measure of the heat dissipation across the air meter 30, compensated by the ambient air temperature, which correlates to mass air flow past the air meter 30 in the air intake system 20.

The signal conditioning circuit 40 includes an operational amplifier 44 ('OP') and a voltage-controlled oscillator 46 ('VCO'). An electrical signal output from the resistance bridge circuit 42 is input to the operational amplifier 44 ('OP') which generates an analog electrical voltage which is input to the voltage-controlled oscillator 46 ('VCO'). The voltage-controlled oscillator 46 generates a digital pulse-width-modulated signal having a cycle period that is based upon the magnitude of the analog electrical voltage input thereto. The digital pulsewidth-modulated signal generated by the voltage-controlled oscillator 46 is signally connected to a time-processing unit 56 ('TPU') of the control module 50 via a wiring harness. The time-processing unit 56 monitors the digital pulsewidth-modulated signal output from the voltage-controlled oscillator 46 and converts it to a magnitude of intake air mass based upon a predetermined calibration for the air meter 30.

Figure 2:
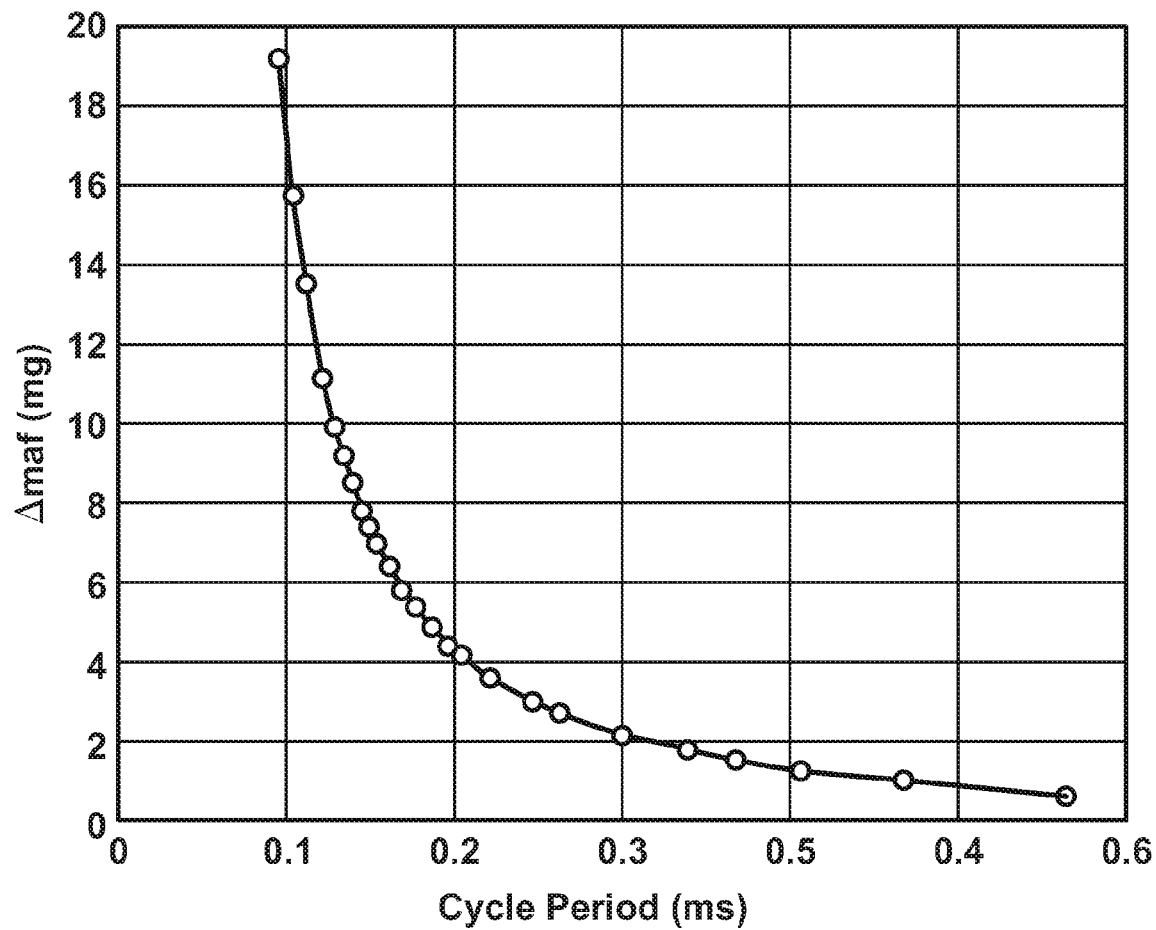
FIG. 2 is a data graph, in accordance with the present disclosure.

FIG. 2 graphically shows a calibration curve illustrative of the predetermined calibration for the air meter system 35. The calibration curve includes a magnitude of the intake air mass ('Δmaf') in milligrams ('mg') plotted as a function of a single cycle period ('Cycle Period (ms)') of the digital pulsewidth-modulated signal output from the signal conditioning circuit 40 of the air meter system 35. The air meter system 35 is preferably pre-calibrated, with the calibration curve executed in the control module 50 as a two-dimensional matrix of values of intake air mass correlating to single cycle periods, or as an algorithm comprising a regression curve of the intake air mass as a function of the single cycle period. The control module 50 uses the calibration curve to determine intake air mass through the air intake system 20 into the engine 10 for each digital pulsewidth-modulated signal having a cycle period output from the air meter system 35 to the time-processing unit 56 of the control module 50. The time-processing unit 56 is preferably utilizing basic memory addressing and summing functions contained therein which provide a real-time numerical integration operation.

The control module 50 preferably comprises a general-purpose digital computer generally comprising a microprocessor or central processing unit ('CPU') 54, storage mediums comprising non-volatile memory including read only memory (ROM) and electrically programmable read only memory (EPROM), random access memory (RAM), a high speed clock, analog to digital conversion circuitry and digital to analog circuitry, and input/output circuitry and devices including the time-processing unit 56, and appropriate signal conditioning and buffer circuitry. The control module 50 has a set of control algorithms, comprising resident program instructions and calibrations stored in the non-volatile memory. The algorithms are executed during preset loop cycles such that each algorithm is executed at least once each loop cycle. Algorithms are executed by the central processing unit 54 to monitor inputs from the aforementioned sensing devices and execute control and diagnostic routines to control operation of the actuators, using preset calibrations. Loop cycles are executed at regular intervals, for example each 3.125, 6.25, 12.5, 25 and 100 milliseconds during ongoing engine operation. Alternatively, algorithms may be executed in response to occurrence of an event.

Figure 3:
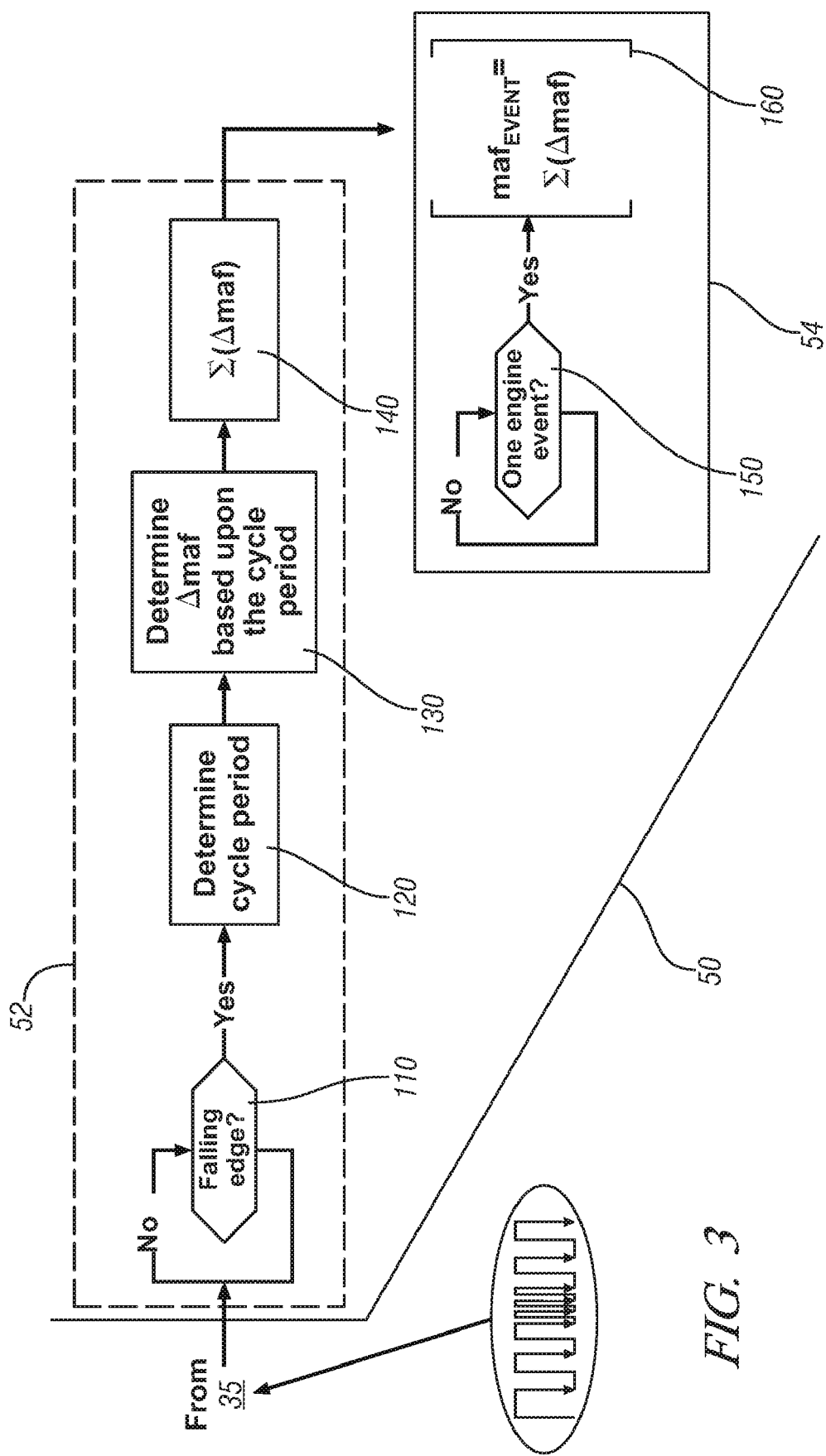
FIG. 3 is an algorithmic flow diagram, in accordance with the present disclosure.
Figure 4:
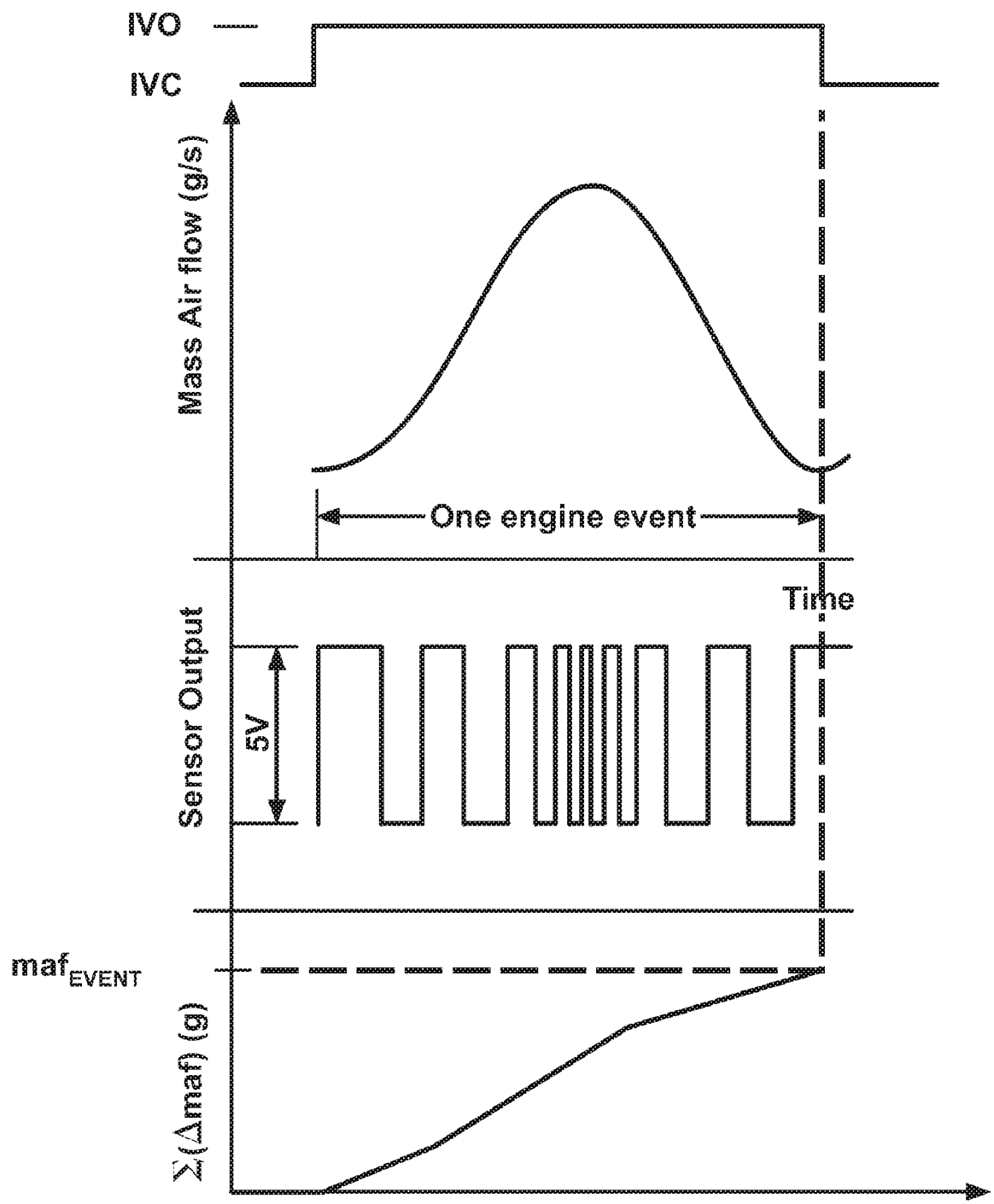
FIG. 4 is an analytical data graph, in accordance with the present disclosure.

FIGS. 3 and 4 schematically and graphically illustrate an algorithm, preferably executed in the control module 50, to determine the intake air mass for a single engine event during engine operation. The illustrated engine event comprises an air intake portion of a combustion cycle, including flow of intake air into one of the combustion chambers 16 of the engine 10 during one combustion cycle. Signals input from the air meter system 35 are monitored using an algorithm 52 that is preferably executed in the time-processing unit 56 ('TPU'). The start and end of each engine event is triggered by specific engine positions, including an intake bottom-dead-center (hereafter 'intake BDC') position of each piston. The start and end of the engine event are preferably identified by monitoring the crank sensor 18. The air meter 30 responds to the intake air flow in the air intake system 20, and the signal conditioning circuit 40 generates a succession of digital pulsewidth-modulated signals based thereon that are input to the time-processing unit 56 of the control module 50. The time-processing unit 56 executes the algorithm 52 to monitor and identify a falling edge for each of the digital pulsewidth-modulated signals as depicted (110), and determines the cycle period in milliseconds (120). The cycle period comprises the elapsed time between successive falling edges for the digital pulsewidth-modulated signals. Intake air mass for each of the successive cycle periods ('Δmaf') is determined using a calibration analogous to the calibration illustrated with reference to FIG. 2, based upon the cycle period (130). During the engine event, the intake air masses for each of the cycle periods ('Δmaf') are integrated by preferably summing the intake air masses for each of the successive cycle periods ('Σ(Δmaf)') (140). The central processing unit 54 monitors the crank sensor 18 to identify the end of the engine event (150), and when the end of the engine event is identified, the intake air mass for the engine event ('$maf_{EVENT}$') is determined based upon the summed intake air masses for the successive cycle periods during the engine event (160). Registers are cleared and the central processing unit awaits occurrence the next engine event. FIG. 4 shows mass air flow during one engine event. Corresponding signal output of the air meter system 35 is shown, and the integrated intake air mass achieved by summing the intake air masses for each of the successive cycle periods ('Σ(Δmaf)'). The intake air mass for the engine event ('$maf_{EVENT}$') is determined at the end of the engine event, i.e., at the intake BDC of each piston. The control module 50 uses the intake air mass for the engine event to control engine operation, including engine fueling, spark timing, and other control parameters for the combustion cycle. Numerical integration of the intake air mass can be accomplished in the time processing unit 56 of the control module 50. Because the integrated value of the intake air mass is in units of mass, the control module 50 can use this value for control and estimation. It can also be converted to a mass air flowrate when divided by total elapsed time.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for determining an intake air mass flowing into an internal combustion engine, comprising:
   equipping an air intake system with an air meter system configured to generate a signal output comprising an elapsed time for a cycle period correlatable to a magnitude of intake air mass;
   determining a start of an engine event;
   monitoring the signal output from the air meter system during the engine event;
   measuring elapsed times for successive cycle periods of the signal output from the air meter system during the engine event;
   determining a magnitude of intake air mass for each of the successive cycle periods of the signal output from the air meter system, wherein the magnitude of intake air mass for each cycle period directly correlates to the elapsed time for the cycle period; and
   integrating the magnitudes of the intake air masses for the successive cycle periods to determine a total air mass during the engine event.

2. The method of claim 1, wherein monitoring the signal output from the air meter system during an engine event comprises monitoring the signal output from the air meter system to determine the intake air mass flowing into a combustion chamber of the internal combustion engine during a single combustion cycle.

3. The method of claim 2, wherein determining the start of the engine event includes determining opening of an intake valve to the combustion chamber.

4. The method of claim 3, further comprising determining an end of the engine event comprising determining closing of the intake valve to the combustion chamber.

5. The method of claim 1, wherein equipping the air intake system with an air meter system configured to generate a signal output comprising an elapsed time for a cycle period correlatable to a magnitude of intake air mass comprises configuring the air meter system to generate a pulsewidth-modulated signal output having a cycle period correlatable to the magnitude of the intake air mass.

6. The method of claim 1, wherein determining the magnitude of intake air mass for each of the successive cycle periods of the signal output from the air meter system, wherein the magnitude of intake air mass for each cycle period correlates to the elapsed time for the cycle period comprises:
   determining the magnitude of intake air mass for each of the successive cycle periods of the signal output from the air meter system using a calibration comprising a two-dimensional matrix of values of intake air mass correlating to single cycle periods.

7. The method of claim 1, wherein determining the magnitude of intake air mass for each of the successive cycle periods of the signal output from the air meter system, wherein the magnitude of intake air mass for each cycle period correlates to the elapsed time for the cycle period comprises:
   determining the magnitude of intake air mass for each of the successive cycle periods of the signal output from the air meter system using a calibration comprising a regression curve of the magnitude of intake air mass as a function of the single cycle period.

8. Method to measure a mass air flow rate into an engine, comprising:
   equipping an air intake system with an air meter system configured to generate a signal output correlatable to intake air mass;
   monitoring the signal output from the air meter system;
   measuring a cycle period associated with the signal output from the air meter system;
   determining a magnitude of intake air mass corresponding to the cycle period based upon a predetermined calibration, the predetermined calibration including magnitudes of intake air mass directly correlated to elapsed cycle period times; and
   integrating the magnitudes of intake air masses for successive cycle periods.

9. The method of claim 8, wherein monitoring the signal output from the air meter system comprises monitoring a pulsewidth-modulated signal output from the air meter system.

10. The method of claim 9, wherein determining a cycle period of the pulsewidth-modulated signal output comprises measuring an elapsed time between successive falling edges of the pulsewidth-modulated signal output.

11. The method of claim 8, wherein said predetermined calibration comprises a relationship between a magnitude of the intake air mass and the cycle period of the pulsewidth-modulated signal output from the air meter system.

12. The method of claim 8, wherein integrating the intake air masses for successive cycle periods comprises summing the intake air masses of successive cycle periods.

13. Apparatus to determine an intake air mass into a combustion chamber of an internal combustion engine during a combustion cycle, comprising: an air meter system comprising
   an air meter configured to monitor air flow in an air intake system, and
   an electronic circuit signally connected to the air meter and configured to generate a pulsewidth signal based upon an output of the air meter, wherein said pulsewidth signal includes a cycle period correlatable to a magnitude of intake air mass; and
   a control module signally connected to the air meter system and including algorithmic code causing the control module to execute steps comprising
      identifying a start and an end of the combustion cycle for the combustion chamber;
      measuring cycle periods of successive pulsewidth signals generated from the electronic circuit during the combustion cycle for the combustion chamber;
      directly converting the measured cycle periods of the successive pulsewidth signals to successive intake air masses; and
      integrating the successive intake air masses during the combustion cycle to determine a magnitude of intake air mass during the combustion cycle for the combustion chamber.

14. The apparatus of claim 13, comprising:
a crank sensor configured to generate a signal correlatable to opening and closing of an intake valve for the combustion chamber, the crank sensor signally connected to the control module; and, the control module including algorithmic code causing the control module to execute steps comprising:

determining an opening and a subsequent closing of the intake valve during the combustion cycle; and identifying the start and the end of the combustion cycle for the combustion chamber corresponding to the opening and subsequent closing of the intake valve during the combustion cycle.

15. The apparatus of claim 13, wherein directly converting the measured cycle periods of the successive pulsewidth signals to successive intake air masses comprises using a matrix of magnitudes of intake air masses and corresponding cycle periods of the pulsewidth-modulated signal to directly convert a measured cycle period of a pulsewidth signal to an intake air mass.

* * * * *